Dec. 10, 1929.                M. ELIAS                  1,738,696
           FABRICATION OF ORNAMENTED SHEET SURFACING MATERIALS
                      Filed Dec. 27, 1926      2 Sheets-Sheet 1
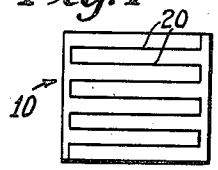
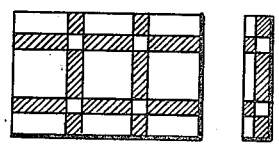
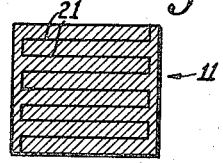
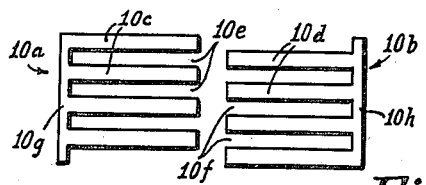
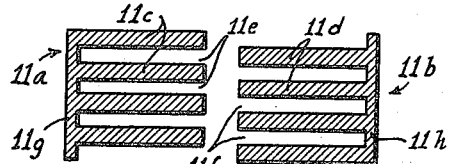
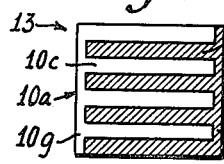
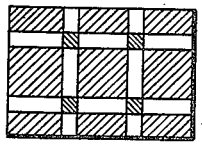
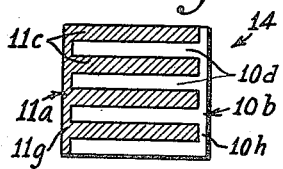
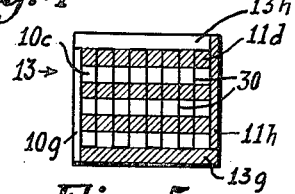
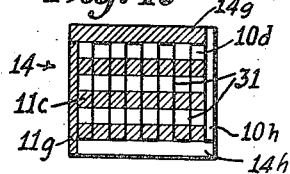
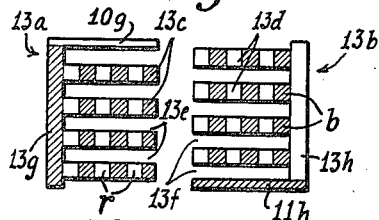
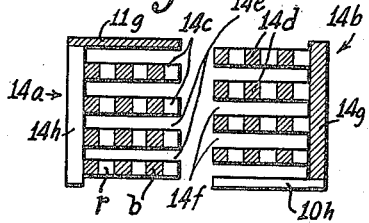
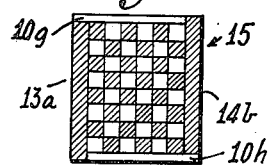
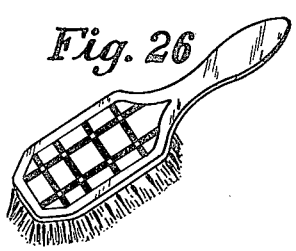
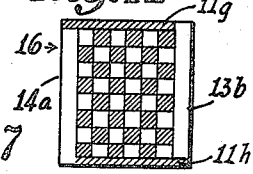
INVENTOR
MAX ELIAS
BY
ATTORNEY Dec. 10, 1929.  M. ELIAS  1,738,696
FABRICATION OF ORNAMENTED SHEET SURFACING MATERIALS
Filed Dec. 27, 1926  2 Sheets-Sheet 2

INVENTOR
MAX ELIAS.
BY
ATTORNEY

Patented Dec. 10, 1929

1,738,696

UNITED STATES PATENT OFFICE

MAX ELIAS, OF NEW YORK, N. Y., ASSIGNOR OF ONE-HALF TO ABRAHAM L. NEBEL, OF CLEVELAND HEIGHTS, OHIO

FABRICATION OF ORNAMENTED SHEET SURFACING MATERIALS

Application filed December 27, 1926. Serial No. 157,203.

This invention relates to the fabrication of ornamented sheet surfacing materials made of wood, fibre, casein, rubber, composition, molded phenol-condensation products or celluloid, for forming decorative trimmings for brushes, mirrors, buttons, cuff links, boxes, gameboards, and other articles.

One object of the invention is to provide an improved process for fabricating ornamental sheet surfacing materials of the character described which shall be simple and easy to carry out.

Another object of the invention is to provide a process for fabricating material of the character described whereby a large and varied selection of ornamental surface designs is made available.

A further object of the invention is to provide a process of the character described, which is relatively cheap to carry out, and practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Figs. 1 to 12, inclusive, are plan views showing the progressive steps in forming a square-checked design of ornamental surfacing material made in accordance with the invention.

Figs. 13 to 18, inclusive, are plan views showing the principal steps of the improved method in forming an elaborate square-checked design of ornamental surfacing material.

Figs. 19 and 20 are plan and side views, respectively, showing a four-colored, double-faced, checked design of surfacing material.

Figs. 21 and 22 are plan and side views, respectively, showing a three-colored, double-faced, checked design of ornamental surfacing material made by the process of the present invention.

Figs. 23 and 24 are plan views of a diamond and wave design of ornamental surfacing material made by said process.

Figs. 25, 26 and 27 are perspective views of a cuff-link, a toilet brush, and a button respectively having incorporated in their structure the improved surfacing material.

Figure 13:
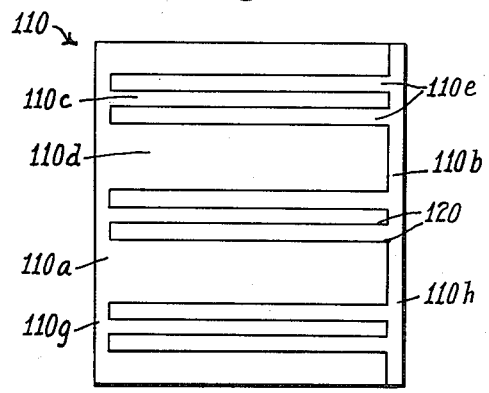

The improved method of fabricating ornamented sheet surfacing materials embodying the invention may be carried out with sheets of wood, fibre, casein, rubber, composition, molded phenol-condensate products, or celluloid. In each case, the sheets selected to carry out the improved process should have different surface texture or color so as to give contrasting effects in the design as will hereinafter more fully appear. The improved process of fabrication using celluloid sheets will now be described.

Referring in detail to the drawings, 10 and 11 denote two blank pieces of sheet celluloid having suitable contrasting surface texture or color; for example 10 may be red, and 11 may be blue. These sheets 10 and 11 are heated until they are in semi-plastic condition so that they are more readily worked on and then they are punched or cut and severed along the zig-zag lines 20 and 21, respectively, as shown in Figs. 1 and 7 in any suitable manner, as by means of any well known comb-tooth cutting device.

The pieces 10 and 11 are then separated at the cut or punched portions along said lines 20 and 21, respectively, to form complementary portions $10^a$, $10^b$ and $11^a$, $11^b$ respectively, as shown in Figs. 2 and 8. Said portions $10^a$ and $10^b$ are seen to comprise similar strips $10^c$ and $10^d$, respectively, which are parallelly disposed and are uniformly spaced a distance equal to the width of a strip as indicated at $10^e$ and $10^f$, respectively. The spaces $10^e$ correspond to the material forming the strips $10^d$ and the spaces $10^f$ correspond to the material forming the strips $10^c$ so that there is no loss or waste of material. Said strips $10^c$ and $10^d$ are preferably interconnected so as to remain in spaced relation by the marginal portion $10^g$ and $10^h$, $10^g$ connecting the strips $10^c$ and $10^h$ connecting the strips $10^d$. In a similar manner, the portions $11^a$ and $11^b$ are formed with strips $11^c$ and $11^d$, respectively separated by spaces $11^e$ and $11^f$ corresponding to portions $10^e$ and $10^f$ respectively, said portions $11^a$ and $11^b$ including marginal interconnecting portions $11^g$ and $11^h$, respectively, which correspond to portions $10^g$ and $10^h$.

The portion $10^a$ is fitted to complementary portion $11^b$ and portion $10^b$ to its complementary portion $11^a$ and the parts are united, as shown in Figs. 3 and 9, by any well known suitable means. Since the materials being worked on are celluloid, an acetone or other cement may be used as the adhesive.

The sheets 13 and 14 while heated are again punched or cut and severed along zig-zag lines 30 and 31 respectively for making strips $13^c$ and $13^d$ extending transversely of the strips $10^c$ and $10^d$, as shown in Figs. 4 and 10, respectively, in a manner similar to that described above for the sheets 10 and 11. The sheets 13 and 14 are then separated at the cut portions along said lines 30 and 31, respectively, to form complementary portions $13^a$, $13^b$, and $14^a$, $14^b$ respectively, as shown in Figs. 5 and 11, respectively. Said portions $13^a$ and $13^b$ then comprise similar strips $13^c$ and $13^d$, respectively, which are parallelly disposed and are uniformly spaced as indicated at $13^e$ and $13^f$, respectively. The spaces $13^e$ correspond to the material forming the strips $13^d$ and the spaces $13^f$ correspond to the materials forming the strips $13^c$ so that again there is no loss or waste of material. Said strips $13^c$ and $13^d$ are left preferably interconnected in spaced relation by the marginal portions $13^g$ and $13^h$, $13^g$ connecting the strips $13^c$, and $13^h$ connecting the strips $13^d$, the remaining marginal portions $10^g$ and $11^g$ forming edge strips on portions $13^a$ and $13^b$ respectively, and marginal portions $11^g$ and $11^h$ forming edge strips on portions $14^a$ and $14^b$. In a similar manner, the portions $14^a$ and $14^b$ are formed with strips $14^c$ and $14^d$ respectively separated by spaces $14^e$ and $14^f$ corresponding in shape and size to the strips $13^e$ and $13^f$, respectively. Each of said strips $13^c$, $13^d$, $14^c$ and $14^d$ is thus formed of a row of contrasting square sections, "$r$" representing red and "$b$", blue.

Portion $13^a$ is next fitted to the complementary portion $14^b$ and portion $13^b$ to complementary portion $14^a$ and the parts united by the same adhesive process as applied in forming the sheets 13 and 14 described above to form integral checked sheets 15 and 16, respectively, as shown in Figs. 6 and 12. It is essential to the formation of a check design that the contiguous sections or squares of the adjoining strips align in contrasting relation. Thus, by the simple process described above, the two square checked ornamental sheets 15 and 16 are formed which may be used as a decorative surface trimming for toilet articles, cuff links, and buttons, such as shown in Figs. 25, 26 and 27, respectively.

The complete process of fabricating the ornamented sheet surfacing material above described is begun with two blank pieces of sheet celluloid 10 and 11 from which the integral striped sheets 13 and 14 are formed. It is to be understood, however, that said striped sheets may be made up in any other suitable manner and the process carried through by the steps described above after forming said striped sheets 13 and 14.

It is apparent that the process described above may also be carried out by dividing the sheets 10, 11 or 13, 14 into separate strips disconnected from each other and then assembling them in their proper relation instead of forming the complementary portions as described. By providing the marginal interconnection in forming the complementary sheet portions, the assembling of the latter to form the striped or checked design sheets is facilitated. It is also obvious that a selective large variety of color combinations may be had by carrying out the process using more than two differently colored blank sheets to start with or by using double-faced sheets having a different color on each side.

Figure 16:
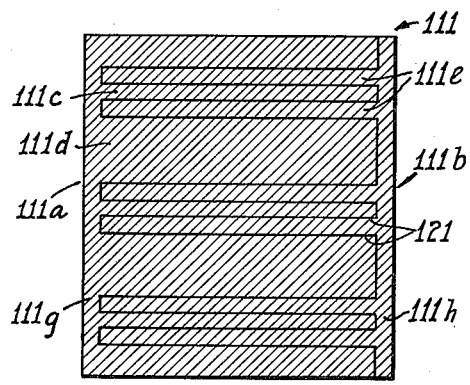

In Figs. 13 to 18, inclusive, the principal steps are shown for forming an elaborate square checked design of ornamental surfacing material. 110 and 111 here denote two blank pieces of sheet celluloid having suitable contrasting surfacing texture or color like pieces 10 and 11 described above. These sheets 110 and 111 are preferably heated until they are in semi-plastic condition so that they are more readily worked and they are punched or cut and severed along the zig-zag lines 120 and 121, respectively, to form the complementary portions $110^a$, $110^b$, $111^a$ and $111^b$, respectively, as shown in Figs. 13 and 16, respectively, in the same manner as described above for the celluloid sheets 10 and 11. The piece 110 is seen to comprise complementary portions $110^a$ and $110^b$ which include strips $110^c$ and $110^d$ extending from marginal portion $110^g$ and strips $110^e$ extending from marginal portion $110^h$, said strips being parallelly disposed. The piece 111 comprising complementary portions $111^a$ and $111^b$ include strips $111^c$ and $111^d$ extending from marginal portion $111^g$ and strips $111^e$ from marginal portion $111^h$. The strips $110^c$ and $110^d$ are not identical in width but they are arranged in regular sequence between spaces left by the removal of strips $110^e$. Likewise, the strips $111^c$ and $111^d$ are made unequal in width and are separated from each other by the space left by removing the strips 111ᵉ to correspond with the strips 110ᶜ, 110ᵈ and 110ᵉ of the sheet 110, respectively.

Figure 14:
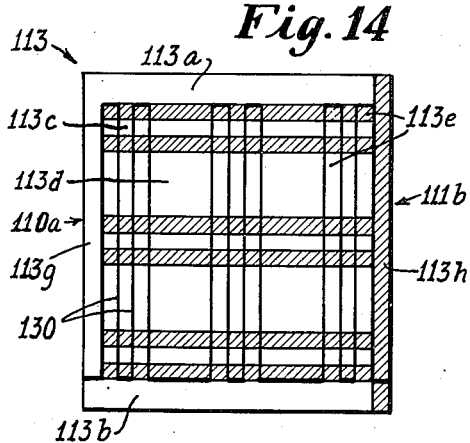
Figure 17:
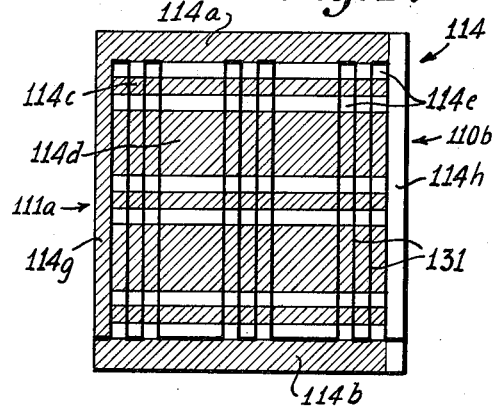
Figure 15:
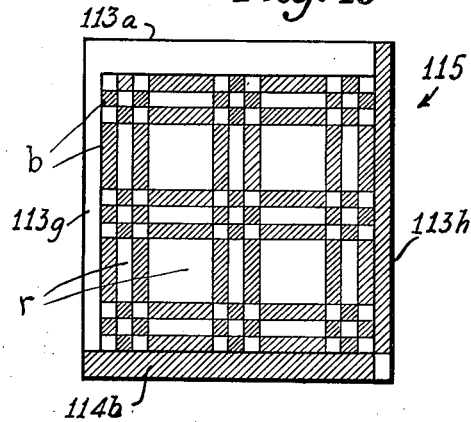
Figure 18:
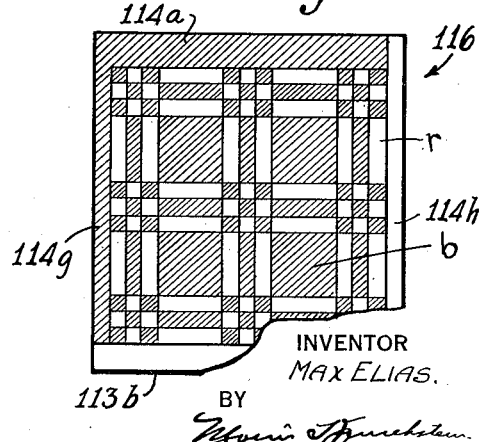

In Figs. 14 and 17, the integral striped sheets 113 and 114, respectively, are shown which are formed by uniting by an adhesive process the complementary portions 110ᵃ with 110ᵇ, and 111ᵃ with 110ᵇ, respectively, in a manner similar to forming sheets 13 and 14 in the process described above. These sheets 113 and 114 while heated are again punched or cut and severed along the zig-zag lines 130 and 131 transversely of the strips 110ᶜ and 111ᶜ respectively, for making strips 113ᶜ and 113ᵈ and 113ᵉ on sheet 113 and strips 114ᶜ, 114ᵈ and 114ᵉ on sheet 114 transversely of the strips 110ᶜ and 111ᶜ, respectively. The sheets 113 and 114 when separated at the cut portion along the lines 130 and 131, respectively, form the complementary portions 113ᵃ, 113ᵇ and 114ᵃ, 114ᵇ, respectively. The portion 113ᵃ includes the strips 113ᶜ and 113ᵈ, the portion 113ᵇ includes the strips 113ᵉ. The complementary portion 114ᵃ includes the strips 114ᶜ and 114ᵈ and the portion 114ᵈ includes the strips 114ᵉ. Said strips 113ᶜ, 113ᵈ and 113ᵉ are preferably left interconnected in spaced relation by the marginal portions 113ᵇ and 113ʰ, respectively, the remaining marginal portions 110ᵍ and 110ʰ forming edge strips on the edge portions 113ᵃ and 113ᵇ, respectively, and marginal portions 111ᵍ and 111ʰ forming edge strips on portions 114ᵃ and 114ᵇ. Each of said strips 113ᶜ, 113ᵈ, 114ᶜ and 114ᵈ is thus formed of a row of contrasting sections, rectangular or square, "r" representing red and "b" representing blue. The complementary portions 113ᵃ and 114ᵇ are fitted together and complementary portion 114ᵇ fitted to the complementary portion 114ᵃ, after which they are united by the same adhesive process as described above to form the elaborate integral checked design sheets 115 and 116, respectively, as shown in Figs. 15 and 18, respectively. It is essential for forming the checked design that the contiguous rectangular or cross-sections of the adjoining strips be aligned in contrasting relation. Thus, by the simple process described above, two checked ornamental sheets 115 and 116 are formed which may be used as a decorative surfacing trimming for toilet articles and the like.

In Figs. 19 and 20 are shown plan and side views, respectively, of a four-colored, double-faced, checked design of ornamental surfacing material made by the improved method. This sheet material is formed by using double-faced sheets having contrasting colors on each side and uniting same in the manner described above. It is apparent that each side of the finished sheets may be formed with two, three or four colors by simply manipulating the complementary portion of the sheets during the process.

In Figs. 21 and 22 are shown plan and side views, respectively, of a three-colored checked design of ornamental material made by the improved method. Here, a sheet of solid color is combined with a sheet having contrasting colors on each of the sides. In this construction, the finished sheet may be formed to have two, or three colors on each side.

Figs. 23 and 24 are plan views of diamond and wave shaped ornamental surfacing material made by the improved method, the strips in the latter case being cut to have serpentine edges and the diamond shaped pattern being formed by cutting the strips in parallel acute angular or diagonal instead of rectangular relation, as shown for sheets 15 and 16.

In Fig. 25, the cuff link shown is provided with a checked ornamental surfacing material, such as formed by the first process described. Fig. 26 shows a toilet brush which has incorporated in the back a surface ornamentation, such as formed from the sheet material similar to that shown in Figs. 19 and 20. Fig. 27 shows a bead or button which is formed from checked materials such as made in accordance with the first example of the process above described.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. Steps in the art of fabricating a sheet surfacing material of the character described from a sheet formed of alternate contrasting strip portions, consisting in cutting the sheet into spaced strips transversely of the length of said portions to leave said strips interconnected along one of their ends so that each strip comprises a row of contrasting sections, and uniting said interconnected strips to other strips similarly formed into an integral sheet with the contiguous sections of the adjoining strips in aligned contrasting relation.

2. Steps in the art of fabricating a sheet surfacing material of the character described from a sheet formed of alternate contrasting strip portions, consisting in cutting the sheet into spaced strips of non-uniform width transversely of the length of said portions to leave said strips interconnected along one of their ends so that each strip comprises a row of contrasting sections, and uniting said interconnected strips to other strips similarly formed into an integral sheet with the contiguous sections of the adjoining strips in aligned contrasting relation.

3. The art of fabricating sheet surfacing materials of the character described consisting in cutting a plurality of sheets of contrasting material into sets of complementary portions having spaced strips interconnected along one of their ends, forming a plurality of integral sheets with the complementary portions with said strips arranged in alternate contrasting relation, cutting the last mentioned sheets transversely of the length of the strips into a second set of complementary portions having spaced strips interconnected along one of their ends so that each of the strips in the latter set comprises a row of contrasting sections, and uniting said second sets of complementary strips to form integral sheets with the contiguous sections of the adjoining strips in aligned contrasting relation.

4. The art of fabricating sheet surfacing materials of the character described consisting in cutting a plurality of sheets of contrasting material into sets of complementary portions having spaced strips interconnected along one of their ends, forming a plurality of integral sheets with the complementary portions with said strips arranged in alternate contrasting relation, cutting the last mentioned sheets transversely of the length of the strips into a second set of complementary portions having spaced strips interconnected along one of their ends so that each of the strips in the later set comprises a row of contrasting sections, making at least two of said strips of unequal width, and uniting said second sets of complementary strips to form integral sheets with the contiguous sections of the adjoining strips in aligned contrasting relation.

5. Steps in the art of fabricating a surfacing material of the character described consisting in forming a plurality of sheets of contrasting material into corresponding complementary portions, each comprising interconnected spaced strips, and uniting pairs of said complementary portions of contrasting material to form integral striped sheets.

6. The art of fabricating a sheet surfacing material of the character described consisting in forming a plurality of sheets of contrasting material into pairs of corresponding complementary portions, each portion to comprise interconnected spaced strips, uniting said complementary portions of contrasting material in pairs to form a plurality of striped sheets forming the latter into pairs of corresponding complementary portions so that each portion comprises interconnected spaced strips, each of the latter strips to have a row of contrasting sections, and uniting the last mentioned complementary portions in pairs to form integral sheets with the contiguous sections of the adjoining strips in aligned contrasting relation.

7. Steps in the art of fabricating a sheet surfacing material of the character described from a sheet formed of alternate contrasting diagonally disposed strip portions, consisting in cutting the sheet into spaced strips diagonally with respect to the length of said portions to leave said strips interconnected along one of their ends so that each strip comprises a row of diamond shaped sections, and uniting said interconnecting strips to other strips similarly formed into an integral sheet with the contiguous sections of the adjoining strips in aligned contrasting relation.

8. The art of fabricating a sheet surfacing material of the character described consisting in cutting a plurality of sheets of contrasting material into serpentine-shaped striped portions from an integral sheet with said serpentine portions arranged in alternate contrasting relation, cutting the last mentioned sheet transversely of the length of said portions into a set of serpentine shaped strips whereby each strip in the set comprises a row of contrasting sections, and uniting said serpentine strips to form an integral sheet with the contiguous sections of the adjoining strips in aligned contrasting relation.

9. Steps in the art of fabricating a sheet surfacing material of the character described from a sheet formed of alternate contrasting serpentine shaped striped portions consisting in cutting the sheet in spaced serpentine-shaped strips transverse the length of said portions to leave said strips interconnected along one of their ends and so that each strip comprises a row of contrasting sections, and uniting said interconnected serpentine-shaped strips to other strips similarly formed into an integral sheet with the contiguous sections of the adjoining strip in aligned contrasting relation.

10. The art of fabricating sheet surfacing materials of the character described consisting in softening a plurality of sheets of contrasting material by the application of heat, cutting said sheets into sets of complementary portions having spaced strips interconnected along one of their ends, forming a plurality of integral sheets with the complementary portions with said strips arranged in alternate contrasting relation, cutting the last mentioned sheets transversely of the length of the strips into a second set of complementary portions having spaced strips interconnected along one of their ends so that each of the strips in the latter set comprises a row of contrasting sections, and uniting said second sets of complementary strips to form integral sheets with the continuous sections of the adjoining strips in aligned contrasting relation.

11. Steps in the art of fabricating a sheet surfacing material of the character described consisting in softening sheets of contrasting material by the application of heat, forming said sheets into corresponding complementary portions each portion comprising interconnected spaced strips, and uniting pairs of said complementary portions of contrasting material to form integral striped sheets.

In testimony whereof I affix my signature.

MAX ELIAS.